Oct. 8, 1963  W. H. COLEMAN ET AL  3,106,671
MULTIFUNCTIONAL CAPACITOR CONSTRUCTION
Filed April 16, 1958  3 Sheets-Sheet 1
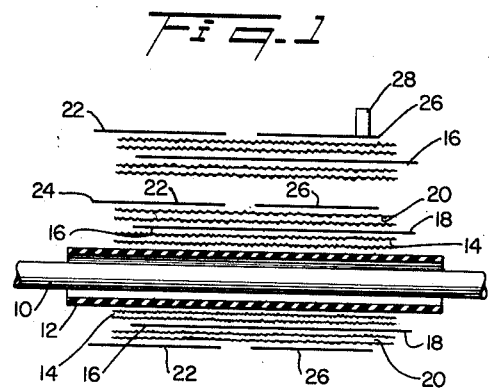
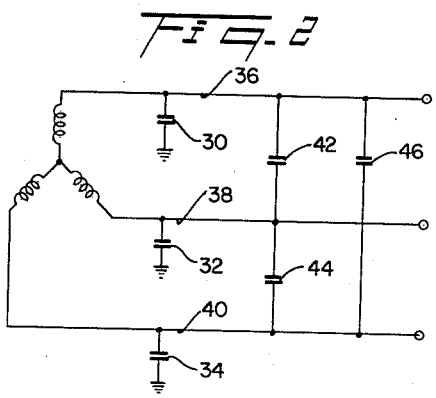
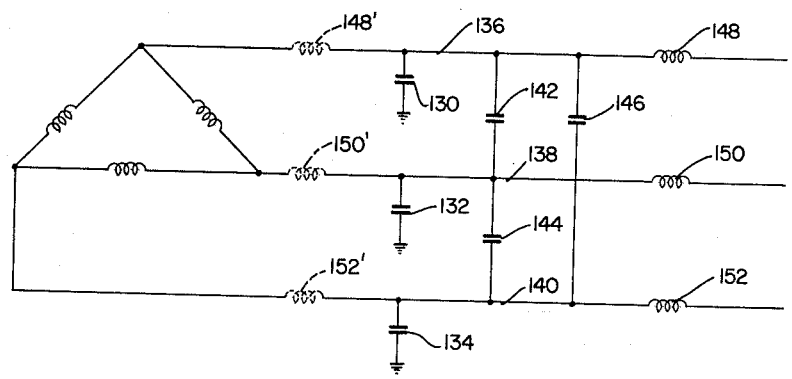
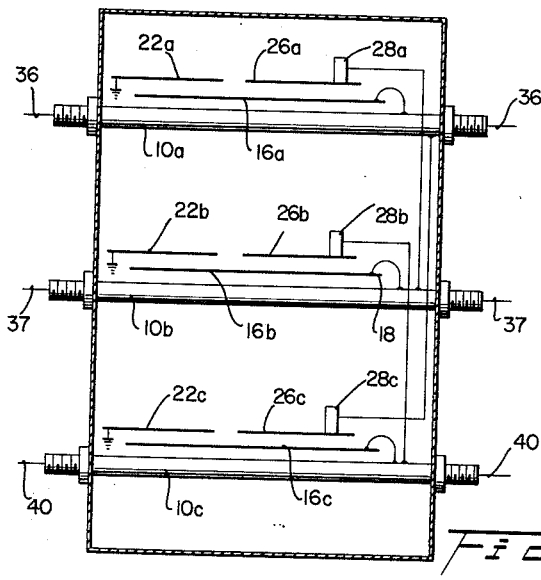
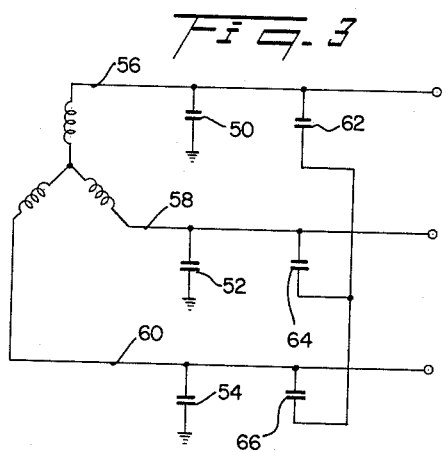
INVENTORS
WILLIAM H. COLEMAN
HAROLD L. MALONE
BY
W. D. Keith
ATTORNEY

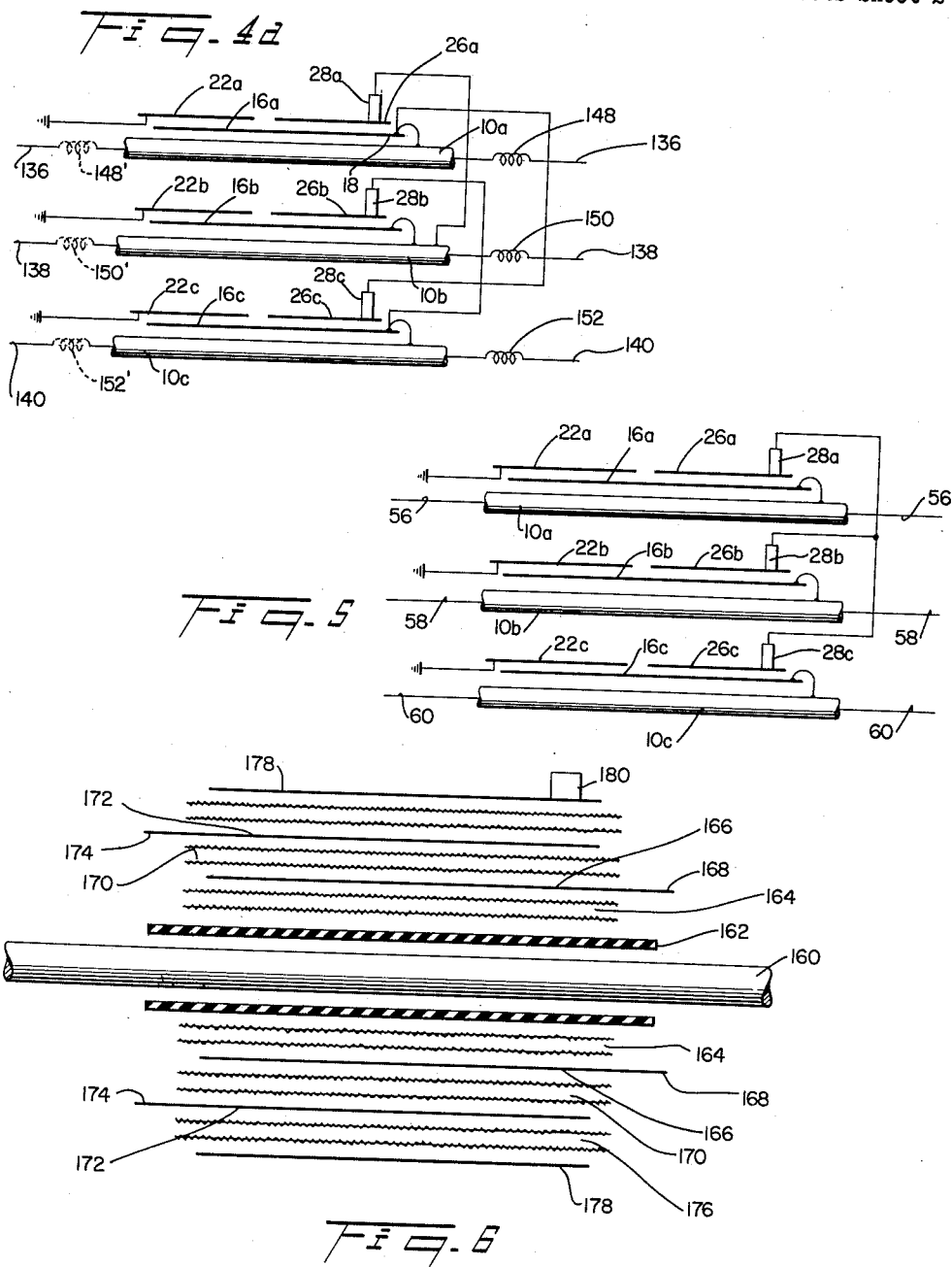

United States Patent Office 3,106,671
Patented Oct. 8, 1963

3,106,671
MULTIFUNCTIONAL CAPACITOR
CONSTRUCTION
William H. Coleman, Redondo Beach, and Harold L. Malone, Inglewood, Calif., assignors to Cornell-Dubilier Electric Corporation, South Plainfield, N.J., a corporation of Delaware
Filed Apr. 16, 1958, Ser. No. 728,906
6 Claims. (Cl. 317—260)

This application relates to electrical capacitors and particularly to an improved construction for multifunctional capacitors.

Recent advances in the electronic arts, and particularly in the field of airborne electronic equipment, have created an increasing demand for compact and lightweight multifunctional capacitor constructions that are readily adaptable for satisfaction of varying electrical requirements. As illustrative thereof, it is often necessary to provide both for the attenuation of high frequency interfering energies and for power factor correction in lightweight airborne or portable equipment and to effect such attenuation and power factor correction by lightweight capacitors of appreciable current carrying capacity.

This invention may be briefly described as an improved multifunctional capacitor construction that may be readily adapted, during the fabrication process, to meet and satisfy the electrical requirements of a given design installation.

The object of this invention is the provision of an improved multifunctional capacitor construction.

Other objects and advantages of this invention will be pointed out in the following specification and illustrated in the accompanying drawings which show, by way of example, the principle of the invention together with the presently preferred embodiments incorporating that principle.

Referring to the drawings:

FIG. 1 is a greatly enlarged schematic longitudinal sectional view of a wound capacitor incorporating the principles of this invention and illustrating the positional relationship between the various foil electrode elements thereof.

FIG. 2 illustrates the utilization of a multiple assembly unit of the basic construction shown in FIG. 1 in a so-called Y connected power source.

FIG. 2A illustrates the utilization of a multiple assembly unit of the basic construction shown in FIGURE 1 in a so-called delta connected power source, including series connected inductors.

FIG. 3 illustrates another utilization of a multiple assembly unit of the basic construction shown in FIG. 1 in a so-called Y connected power source.

FIG. 4 is a schematic representation of the internal connections in the multiple assembly unit employable in the circuit of FIG. 2.

FIG. 4A is a schematic representation of the internal connections in the multiple assembly unit employable in the circuit of FIGURE 2A.

FIG. 5 is a schematic illustration of the internal connections in a multiple assembly unit adapted for inclusion in the circuit of FIG. 3.

FIG. 6 is a greatly enlarged schematic longitudinal sectional view of another wound capacitor construction incorporating the principles of this invention and illustrating the positional relationship between the various foil electrode elements thereof.

Figure 7:
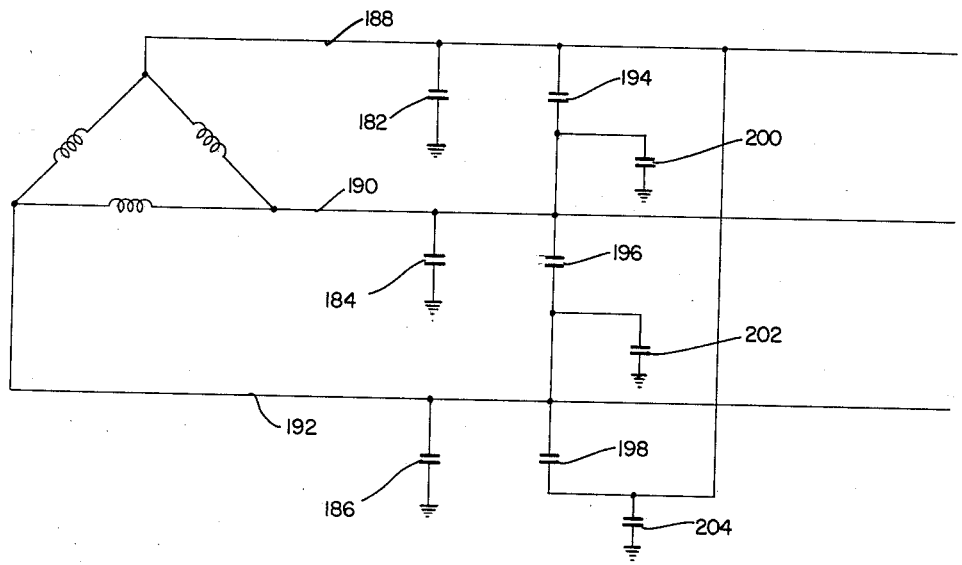
FIG. 7 illustrates the utilization of a multiple assembly unit of the basic construction shown in FIG. 6 in a so-called "delta" connected power source.

The structural essentials of the improved multifunctional capacitor forming the subject matter of this invention are illustrated in FIG. 1 wherein there is provided an elongate preferably cylindrical shaped conducting core member or feed through stud 10 having a surrounding tubular insulating sleeve member 12 encompassing the same over a major portion of its length. Wound about the sleeve 12 is a convolute multiple capacitor unit including, in sequential overlaying layers, a plurality of dielectric strips 14, a first electrode element formed of a relatively wide foil strip 16 sized to extend beyond one edge of the dielectrics 14 as at 18, a second dielectric layer preferably composed of a plurality of strips of dielectric material 20, a second electrode 22 having one end extending beyond the edge of the dielectric strips 20 as at 24, and an adjacent third electrode 26 disposed coplanar with and spaced from the second electrode 22 and having a conducting tab member 28 attached thereto at the end thereof disposed on the outer periphery of the convolutely wound unit.

The width of the second and third electrode foils, 22 and 26 respectively, may be readily varied in accordance with the requirements of a particular installation and the problem to be solved or overcome by the utilization thereof. For example, if the second electrode 22 is to be connected to ground and employed as a feed-through filter capacitor and the third electrode 26 is to be employed as a power factor correction capacitor, it is possible, by varying the active width of these two foil electrodes and/or the number of interleaving dielectric layers, to change the capacity of the feed-through section to any value desired and likewise to secure any value of capacitance needed for power factor correction or for any other purpose.

In the illustrated embodiment the first electrode 16 is wound so as to provide an extending edge portion 18. Similarly, the second electrode 22 is sized and positioned so as to provide an extending edge portion 24 at the other end of the convolutely wound unit. The presence of such extending edge portions readily permits the rendering of such electrode windings substantially non-inductive by conventional means. In the particular embodiment that will be hereinafter described the first and second electrode elements 16 and 22 are preferably rendered substantially non-inductive by copper and lead spraying the ends of the convolutely wound unit to provide a common electrical connection intermediate all of the extending ends 18 of the foil 16 and all of the extending ends 24 of the foil 22 respectively.

A multifunctional capacitor of the type described above may, by suitable internal connection of the various electrical elements, be utilized to satisfy a number of varying electrical requirements. Such a unit may be used individually or a plurality thereof may be assembled in a single can or container to provide a multiple capacitor structure of extremely small size minimum impedance connection, lightweight, and high current carrying ability.

By way of example, an assemblage of three of the above described units has proven to be of appreciable utility in conjunction with three-wire power circuits for airborne or light portable electric equipment. FIGS. 2 and 4 are schematically illustrative of the essentials of such assemblage. As shown in FIG. 2 a desirable Y power connection in a three-wire power circuit may include individual bypass or filter capacitors 30, 32 and 34, respectively connected intermediate the power carrying lines 36, 38 and 40 and ground. In addition thereto individual power factor correction capacitors 42, 44 and 46 are desirably connected across the power lines 36, 38; 38, 40 and 40, 36, respectively. Such a desired connection may be simply and economically formed by suitably encasing three of the wound units of the basic structure described in FIG. 1. In such a unit, as schematically illustrated in FIG. 4, there are provided three conducting core members or feed-through studs 10a, 10b and 10c sized so that the ends of the core members extend beyond the casing and serve as the connecting terminal members for the encased unit. As illustrated in FIG. 4, the core members 10a, 10b and 10c are selectively series connected in the lines 36, 38 and 40, respectively. The non-inductive foil electrodes 22a, 22b and 22c may readily be connected, by an entirely self-contained internal connection, to the unit casing which may be conveniently grounded. Each of the first electrode elements, i.e., the wide foils 16a, 16b and 16c are selectively connected to the conductive core members 10a, 10b and 10c internally of the encased unit as by connecting the extending lines 18 thereof to the feed-through stud 10 adjacent the terminals of the insulating sleeve 12. In such an arrangement the foils 22a, 22b and 22c together with the foils 16a, 16b and 16c constitute the filter or bypass capacitors 30, 32, 34 as illustrated in FIG. 2. In order to constitute the power factor correction capacitors 42, 44, 46 the tab 28a on foil electrode 26a is connected to the core 10b, the tab 28b on foil electrode 26b is connected to the core 10c and tab 28c on foil electrode 26c is connected to core 10a. Such internal connection automatically provides for the power factor correction capacitors 42, 44 and 46.

FIGS. 2a and 4a are essentially similar to the arrangement illustrated in FIGS. 2 and 4 and described above and are illustrative of the utilization of the invention in conjunction with a "delta" connected power source. FIGS. 2a and 4a also show the permitted inclusion of inductance coils into the assemblage and which readily could be incorporated into the same container encasing the multifunctional capacitor units. As shown in FIG. 2a, a desirable "delta" power connection in a three-wire power circuit may include individual bypass or filter capacitors 130, 132 and 134 respectively connected intermediate the power carrying lines 136, 138 and 140 and ground. In addition thereto, suitable power factor correction capacitors 142, 144 and 146 are desirably connected across the power lines 136, 138; 138, 140 and 140, 136 respectively. FIG. 2a also illustrates the desired series inclusion of inductances 148, 150 and 152 in the lines 136, 138 and 140 respectively. The drawing also shows, by the dotted coils 148', 150' and 152' a possible alternate location for the above mentioned inductances 148, 150 and 152.

Such a desired connection may be simply and economically formed by suitably encasing three of the wound units of the basic structure described in FIG. 1 together with the three prefabricated inductance coils of suitable character. In such a unit, as schematically illustrated in FIG. 4a, there are provided three conducting core members 10a, 10b and 10c. As illustrated, the core members 10a, 10b and 10c and the inductance coils 148, 150 and 152 are selectively series connected in the lines 136, 138 and 140, respectively. If desired, the inductance 148, 150 and 152 may be included at the locations indicated by the dotted coils 148', 150' and 152'. The noninductive foil electrodes 22a, 22b and 22c may readily be connected, as by an entirely self-contained internal connection, to the unit casing which may be conveniently grounded. Each of the first electrode elements, i.e., the wide foils 16a, 16b and 16c are selectively connected to the conducting core members 10a, 10b and 10c respectively internally of the encased unit as by non-inductively connecting the extending ends 18 thereof to the feed-through studs adjacent the end of the insulating sleeve 12. In such an arrangement the foils 22a, 22b and 22c together with the foils 16a, 16b and 16c constitute the filter or bypass capacitors 130, 132 and 134 as illustrated in FIG. 2a. In order to constitute the power factor correction capacitors 142, 144 and 146, the tab 28a on foil electrode 26a is connected to the core 10b, the tab 28b on foil electrode 26b is connected to the core 10c and the tab 28c on foil electrode 26c is connected to the core 10a. Such internal connection automatically provides for the power factor correction capacitors 142, 144 and 146.

Utilization of a multifunctional capacitor of the type described above automatically provides for both the filtering of undesired high frequency interfering energies and for the necessary power factor correction in the illustrated three-wire circuits simply by series inclusion of the individual core members in the individual power lines. In such installations it should be noted that the lead lengths are extremely short which contribute to a preferred type of performance for a unit of this character.

FIGS. 3 and 5 schematically illustrate the essentials of another assemblage of individual capacitors of the type herein of concern together with the necessary interconnection of the various electrode elements for use in a Y connected three-wire power circuit. FIG. 3 illustrates a desirable Y conneted power source in a three-wire circuit and includes individual bypass or filter capacitors 50, 52 and 54 respectively connected to the power lines 56, 58 and 60 and ground, resulting in a grounded Y connection. Also desirably included in such a circuit are individual power factor correction capacitors 62, 64 and 66 arranged so that capacitors 62 and 64 are connected in series intermediate the lines 56 and 58; so that capacitors 64 and 66 are connected in series intermediate the lines 58 and 60 and so that capacitors 66 and 62 are connected in series intermediate the lines 56 and 60, respectively resulting in a floating Y connection.

Such a desired connection may be simply and economically preformed by encasing three of the wound units of the structure heretofore described in conjunction with FIG. 1 in a single casing. In such a unit, as illustrated in FIG. 5, the three conducting core members or feed-through studs 10a, 10b and 10c are sized so as to extend beyond the casing at each end thereof and to thereby serve as the connecting terminal members for the encased unit. As schematically shown in FIG. 5 such an assemblage includes the core members 10a, 10b and 10c series connected in the lines 56, 58 and 60, respectively. The non-inductive bypass foil electrodes 22a, 22b and 22c are conveniently connected, by an entirely selfcontained internal connection, to the unit casing which may be conveniently grounded. Each of the first electrode elements, i.e., the wide foils 16a, 16b and 16c are selectively connected to the core members 10a, 10b and 10c, respectively, internally of the encased unit. The tab 28a on foil 26a is connected to tab 28b on foil 26b, and the tab 28b is also connected to tab 28c on foil 26c. So connected the foil electrodes 26a, 26b and 26c and foil electrodes 16a, 16b and 16c cooperate to form the desired arrangement of power factor correction capacitors 62, 64 66. In a similar manner the foils 22a, 22b and 22c in conjunction with the foils 16a, 16b and 16c form the filter capacitors 50, 52 and 54, respectively.

As was the case with the heretofore described WYE and delta connection, the above described assemblage of the individual units may be simply prefabricated to form an entirely self-contained unit to provide the circuits of FIG. 3 solely by connection of the core members 10a, 10b and 10c in the power lines 56, 58 and 60.

FIG. 6 is a greatly enlarged schematic longitudinal sectional view of another wound capacitor construction incorporating the principles of this invention. As here illustrated, there is provided an elongate conducting core member or feedthrough stud 160 having a surrounding tubular insulating sleeve member 162 encompassing the same over a major portion of its length. Wound about the sleeve 162 is a convolute multi-electrode capacitor section including, in sequential overlaying layers, a plurality of dielectric strips 164, a first electrode element formed of a foil strip 166 positioned to extend beyond one edge of the dielectric media 164 as at 168, a second dielectric layer preferably composed of a plurality of strips of dielectric material 170, a second electrode 172 of a width substantially equivalent to that of the electrode 166 and positioned so that one end thereof extends beyond the outer edge of the dielectric strips 170 as at 174, a third dielectric layer 176 preferably composed of a plurality of strips of dielectric material and a third electrode formed of a foil strip 178 of a width preferably slightly less than of the electrodes 166 and 172 and positioned so that the ends thereof are positioned inwardly of the end of the dielectric material. The third electrode 178 is provided with a conducting tab member 180 attached thereto at the end thereof disposed on the outer periphery of the convolutely wound unit.

In this embodiment, the first electrode 166 is positioned as to provide an extending edge portion 168 at one end of the found unit and the second electrode 172 is positioned to provide an extending edge portion 174 at the other end of the convolutely wound unit. The presence of such extending edge portions readily permits the rendering of such electrode windings substantially non-inductive by conventional means as by spraying the ends with copper and lead to provide a common electrical connection intermediate all of the extending ends 168 of the foil 166 and all of the extending ends 174 of the foil 172.

By way of example, an assemblage of three of the above described units has proven to be of appreciable utility in conjunction with three wire power circuits for airborne or light portable electrical equipment.

Figure 8:
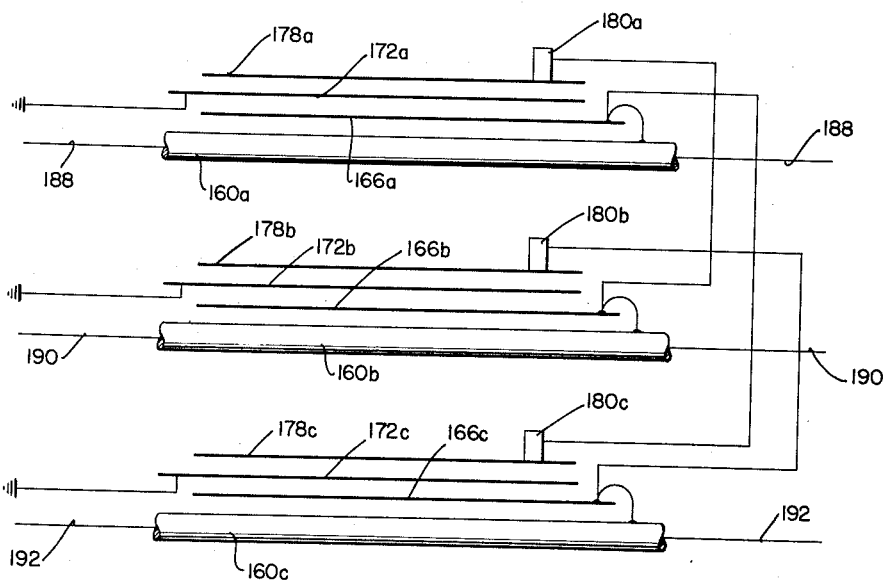
FIG. 8 is an enlarged, more or less schematic view of a series of condenser sections employing a different arrangement of foils in the winding of the sections.

FIGS. 7 and 8 are schematically illustrative of the essentials of such an assemblage. As shown in FIG. 7, a desirable "delta" power connection in a three-wire power circuit may include individual bypass capacitors 182, 184 and 186, respectively, connected intermediate the power carrying lines 188, 190 and 192. Individual power factor correction capacitors 194, 196 and 198 are desirably connected across the power lines 188, 190; 190, 192 and 192, 188 respectively. In addition thereto the lines 188, 190 and 192 are additionally bypassed to ground by capacitors 204, 200 and 202 respectively.

Such a desired connection may be simply and economically formed by suitable encasing three of the wound units of the basic structure described in conjunction with FIG. 6. In such a unit, as schematically illustrated in FIG. 8, there are provided three conducting core members or feedthrough studs 160a, 160b and 160c sized so that the ends thereof extend beyond the casing and serve at the connecting terminal members for the encased unit. The core members 160a, 160b and 160c are selectively series connected in the lines 188, 190 and 192, respectively.

Non-inductive foil electrodes 166a, 166b and 166c are selectively connected to the feed-through studs 160a, 160b and 160c, respectively, internally of the encased unit. The non-inductive second foil electrodes 172a, 172b and 172c may readily be connected by an entirely self-contained connection to the unit casing which may be conveniently grounded. In such an arrangement the foils 166a, 166b and 166c together with the foils 172a, 172b and 172c constitute the filter or bypass capacitors 182, 184 and 186 as illustrated in FIG. 7. In order to constitute the power factor correction capacitors 194, 196 and 198 the tab 180a on foil electrode 178a is connected to the stud 160b, the tab 180b on foil electrode 178b is connected to the stud 160c and tab 180c on the foil electrode 178c is connected to the stud 160a. Such internal connection in conjunction with the foil electrodes 166a, 166b and 166c automatically provides for the power factor correction capacitors as mentioned above. The additive filter capacitors 200, 202 and 204 are automatically provided by the foils 178a, 178b and 178c operating in conjunction with the foils 172a, 172b and 172c, respectively. In the illustrated connection it will be seen that the feed-through stud 160a and line 188 are connected to ground through the capacitor formed by the foil electrode 178c and foil electrode 172c. The stud 160b is connected to ground through the capacitor formed by the foils 178a and 172a and the stud 160c is connected to ground through the capacitor formed by the foil electrodes 178b and 172b.

It will be apparent that many varied capacitors can result from utilization of the particular arrangements hereinabove described depending upon the size and arrangement of the foils and the interconnection thereof. Weights and dimensions of the respective foils making up the individual electrodes can be varied widely to effect the desired control of the resultant capacity.

It will be further apparent that many multiple uses of these varied capacitors can be obtained by the proper internal or external connection, as may be desired. The particular structures above described are particularly effective in that the actual lead connections are substantially reduced, resulting in more efficient radio interference suppression as well as power factor correction.

Because of the method of winding used in the above described examples, resulting in very short and mechanically stable structures and the reduced series inductance of the windings and connections, the finished units are characterized by high efficiency in the suppression of undesirable radio frequency energies giving a high attenuation. Numerous and apparent modifications of these structures will permit any desired radio frequency suppression and power factor correction for high power current as well as low power current applications.

Incorporation and utilization of the above described principles of the invention permits numerous uses thereof, such as A.C. power factor correction and radio frequency suppression in airborne power systems, both in manned and unmanned aircraft, in ground handling, flight line or field test equipment, or in industrial power facilities, as well as in bi-directional D.C. power plants, ungrounded bi-directional D.C. motors wherein the motor under one condition of operation will operate in a clockwise direction and in the opposite condition will operate in a counter-clockwise direction.

In the case as applicable to a D.C. motor, this device as described would contain radio interference to the motor or noise source during each function of its operation, such as a switching or reversing operation.

Having thus described our invention, we claim:

1. A multifunctional capacitor construction comprising a feed through stud formed of conducting material, a layer of insulating material surrounding said stud over a major portion of its length, a multielectrode capacitor section formed of a plurality of discrete foil electrode elements and discrete interleaving dielectric media convolutely wound about said layer of insulating material including, a first discrete electrode element extending beyond one edge of said dielectric media, a second discrete electrode element convolutely interwound with said first electrode element and insulatingly spaced therefrom extending beyond the other edge of said dielectric media and a third discrete electrode element convolutely interwound with said first electrode element and insulatingly spaced from said first and second electrode elements having a terminal tab electrically connected thereto and extending externally of the periphery of the wound unit.

2. The capacitor construction as set forth in claim 1 wherein the portion of said first convolutely wound electrode element extending beyond the edge of the dielectric media is noninductively connected to said feed through stud.

3. The capacitor construction as set forth in claim 1 wherein the portions of said second convolutely wound electrode element extending beyond the edge of the dielectric media are electrically connected to each other to render the same substantially non-inductive.

4. The capacitor construction as set forth in claim 1 wherein said second and third electrode elements are disposed in spaced coplanar relation.

5. The capacitor construction as set forth in claim 1 wherein said second and third electrode elements are disposed in interplanar relationship and are separated by interleaved dielectric media.

6. A multifunctional capacitor construction comprising a feed through stud formed of conducting material, a layer of insulating material surrounding said stud over a major portion of its length, a multielectrode capacitor section formed of a plurality of discrete foil electrode elements and discrete interleaving dielectric media convolutely wound about said layer of insulating material including, a first discrete electrode element having a portion extending beyond one edge of said dielectric media and having said extending portion noninductively connected to said feed through stud, a second discrete electrode element convolutely interwound with said first electrode element and insulatingly spaced therefrom extending beyond the other edge of said dielectric media and having the extending portions thereof electrically connected to each other to render the same substantially non-inductive and a third discrete electrode element convolutely interwound with said first electrode element and insulatingly spaced from said first and second electrode elements having a terminal tab electrically connected thereto and extending externally of the periphery of the wound unit.

References Cited in the file of this patent

UNITED STATES PATENTS

| | | |
|---|---|---|
| 2,270,953 | Manz et al. | Jan. 27, 1942 |
| 2,521,828 | Chatterton et al. | Sept. 12, 1950 |
| 2,526,321 | Beverly | Oct. 17, 1950 |
| 2,721,311 | Netherwood et al. | Oct. 18, 1955 |
| 2,949,570 | Rayburn | Aug. 16, 1960 |

FOREIGN PATENTS

| | | |
|---|---|---|
| 295,225 | Switzerland | Feb. 16, 1954 |
| 401,367 | Germany | Aug. 30, 1924 |
| 629,189 | Great Britain | Sept. 14, 1949 |